METHOD OF AND APPARATUS FOR CHARACTER RECOGNITION

Filed Dec. 31, 1962 7 Sheets-Sheet 1

INVENTORS.
RICHARD K. ORTHUBER
CHARLES V. STANLEY
THOMAS P. DIXON
BY Robert Lieber
ATTORNEY

METHOD OF AND APPARATUS FOR CHARACTER RECOGNITION

Filed Dec. 31, 1962 7 Sheets-Sheet 2

INVENTORS.
RICHARD K. ORTHUBER
CHARLES V. STANLEY
THOMAS P. DIXON
BY Robert Lieber
ATTORNEY INVENTORS
RICHARD K. ORTHUBER
CHARLES V. STANLEY
THOMAS P. DIXON
BY Robert Lieber
ATTORNEY Oct. 18, 1966 R. K. ORTHUBER ET AL 3,280,257

METHOD OF AND APPARATUS FOR CHARACTER RECOGNITION

Filed Dec. 31, 1962 7 Sheets-Sheet 4

INVENTORS.
RICHARD K. ORTHUBER
CHARLES V. STANLEY
THOMAS P. DIXON

BY Robert Lieber
ATTORNEY

INVENTORS.
RICHARD K. ORTHUBER
CHARLES V. STANLEY
THOMAS P. DIXON
BY Robert Lieber
ATTORNEY

METHOD OF AND APPARATUS FOR CHARACTER RECOGNITION

Filed Dec. 31, 1962

INVENTORS.
RICHARD K. ORTHUBER
CHARLES V. STANLEY
THOMAS P. DIXON
BY Robert Lieber
ATTORNEY

METHOD OF AND APPARATUS FOR CHARACTER RECOGNITION

Filed Dec. 31, 1962 7 Sheets-Sheet 7

INVENTORS.
RICHARD K. ORTHUBER
CHARLES V. STANLEY
THOMAS P. DIXON
BY Robert Lieber
ATTORNEY 3,280,257

METHOD OF AND APPARATUS FOR CHARACTER RECOGNITION

Richard K. Orthuber, Sepulveda, Charles V. Stanley, Granada Hills, and Thomas P. Dixon, Northridge, Calif., assignors to International Telephone and Telegraph Corporation, Nutley, N.J., a corporation of Maryland Filed Dec. 31, 1962, Ser. No. 248,385
16 Claims. (Cl. 179—1)

This invention relates to a method of and an apparatus for recognizing and identifying characters, especially characters representing speech.

Automatic speech recognition has been a serious problem in the field of acoustics and data processing. A reliable device of this kind which would be able to handle a large repertory of words and at the same time be insensitive to the unavoidable variations of speech characteristics from speaker to speaker would be extremely useful as an input device for a typewriter, producing automatically printed material from a direct speech input or tape recording. Such a device might possibly be even more important as an efficient speech encoder, permitting the transmission of speech input by means of a channel of extremely restricted capacity.

Accordingly an object of the invention is to provide a method of and an apparatus for recognizing spoken words regardless of the particular characteristics of the speaker or the speed at which he speaks.

Another object of the invention is to provide a method of and an apparatus for recognizing and identifying a continuous succession of spoken words in real time so as to control other apparatus, as desired.

Another object of the invention is to provide speech recognition apparatus which contains a library of word forms or patterns with which spoken words are automatically compared at very high speed, so as to compare each spoken word, substantially as it is spoken, with every word in the library.

Another object of the invention is to provide a library of word forms or patterns for a speech recognition apparatus and a method of making such a library, each word form or pattern including the characteristics of a predetermined number of different speakers.

Still another object of the invention is to provide a library of word forms or patterns for a speech recognition apparatus in which the word forms are masked to reduce redundancy, and to provide a method of making such a library.

Still another object of the invention is to provide a library of word forms or patterns for a speech recognition apparatus in which the forms or patterns are masked to emphasize characteristics which help to distinguish the word from other similar words, and to provide a method of making such a library.

Other objects and objects relating to the construction of the word library and to the assembly and operation of the apparatus will be apparent as the description proceeds.

The invention is illustrated in the accompanying drawings in which:

FIGURES 1*a*, 1*b*, and 1*c* are a group of three power-trace sonagrams of a sentence enunciated by three different speakers and recorded by the apparatus, and showing the distribution of power in a predetermined group of frequency ranges for each of the three speakers;

Figure 12:
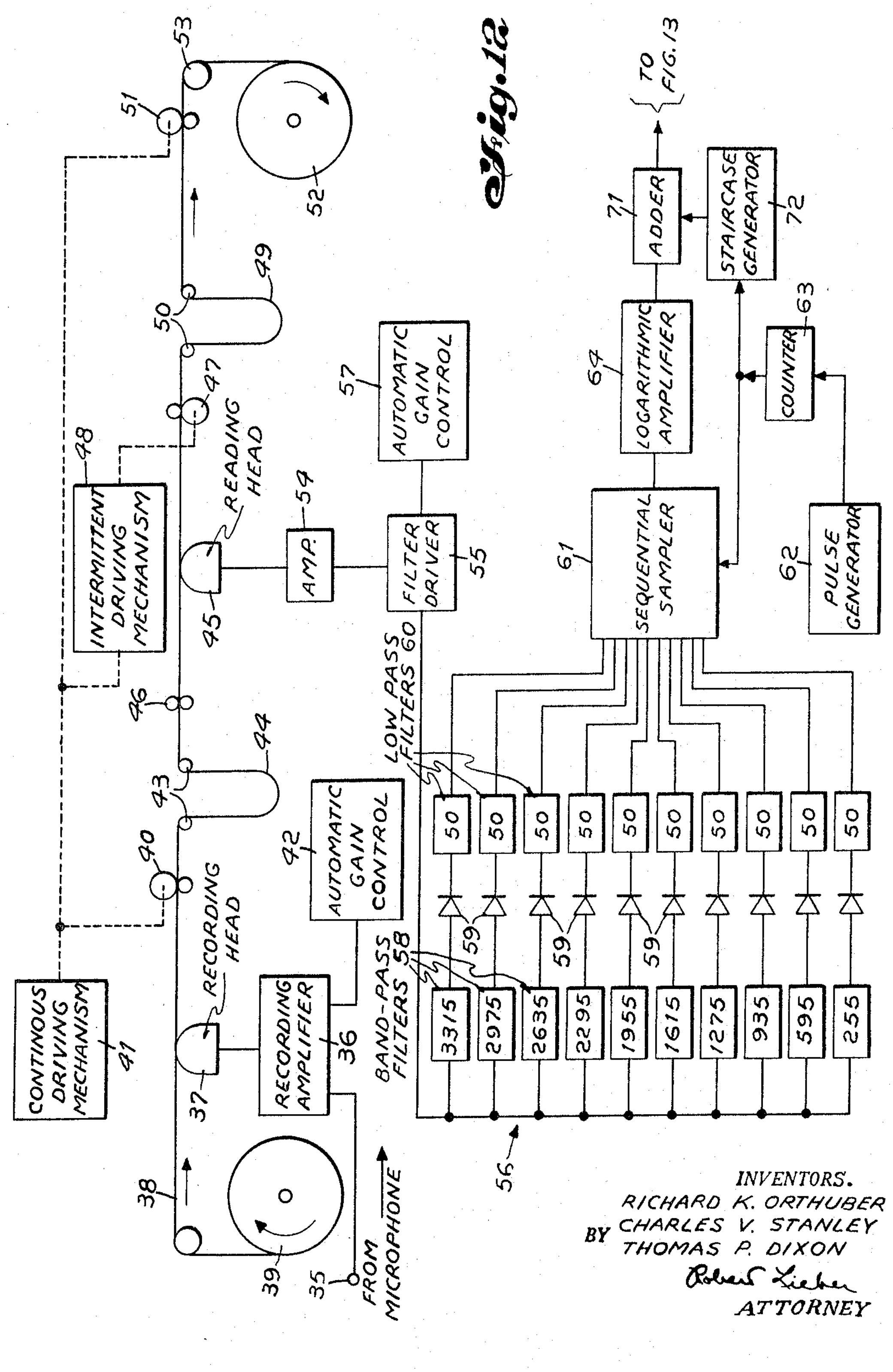
Figures 13, 14:
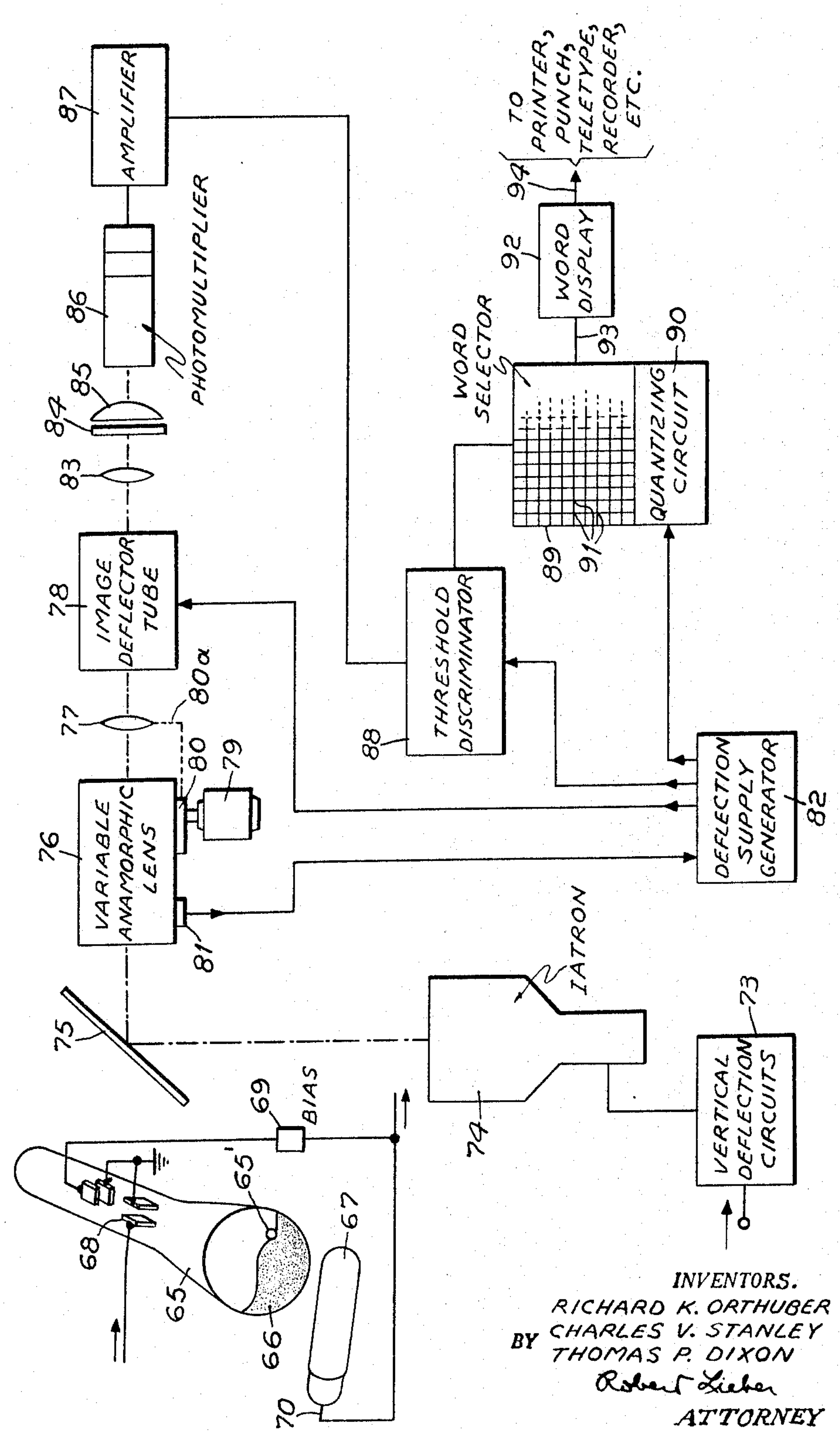

FIGURES 9*a* and 9*b*, 10*a* and 10*b*, and 11*a* and 11*b* are sonagrams illustrating the effect of redistribution of samples;

FIGURE 12 is a block diagram of a portion of the recognition apparatus showing the recorder, the reader, and the frequency spectrum analyzer;

FIGURE 13 is a block diagram of a portion of the recognition apparatus showing the electron-optical evaluator; and FIGURE 14 is a diagrammatic representation of a form of logarithmic amplifier which may be used with the apparatus.

One manner in which spoken words may be identified is to provide a library of word sonagrams and then produce a sonagram of the unknown word and compare it with all the words in the library until the one is found which matches it. One of the problems in building an apparatus to accomplish this is to provide sufficient speed of operation of the comparing procedure to permit the recognition to be performed in real time. Another important problem is to accommodate the operation of the apparatus for different rates of enunciation used by the same or different speakers. An even more important problem, and one more difficult to solve, is to provide the apparatus with means for recognizing words enunciated by speakers from different sections of the country with widely different accents and pronunciation characteristics.

We have solved the three problems outlined above by means of the method and apparatus now to be described.

A reference library of wave form patterns representing all the words to be included in the library is specially constructed from sonagrams obtained from a predetermined number of different speakers with widely different speech characteristics, each speaker enunciating all the words of the library.

Recorded intervals of predetermined time duration of the voice of a speaker whose words are to be recognized are translated into power-trace sonagrams which are then caused to sweep across the entire library of reference patterns at very high speed to search for one coming nearest to it in characterstics. In order to accommodate to the different rates of enunciation of different speakers, or of the same speaker at different times, the length of the unknown power-trace sonagram is altered continuously between predetermined limits while the scanning is taking place, so that each word of the reference library is scanned a number of times by the unknown sonagram, and at each scanning the unknown sonagram is a different length.

In order to include in the library the different characteristics of a large number of different speakers, we provide one sonagram for each word and we construct that sonagram in a particular manner so that it will include all the different accents, inflections, and other characteristics of different speakers that the machine is likely to encounter in the course of its operation.

The nature of the particular type of sonagram used in the library and the manner of producing them will first be described.

Figure 1A:
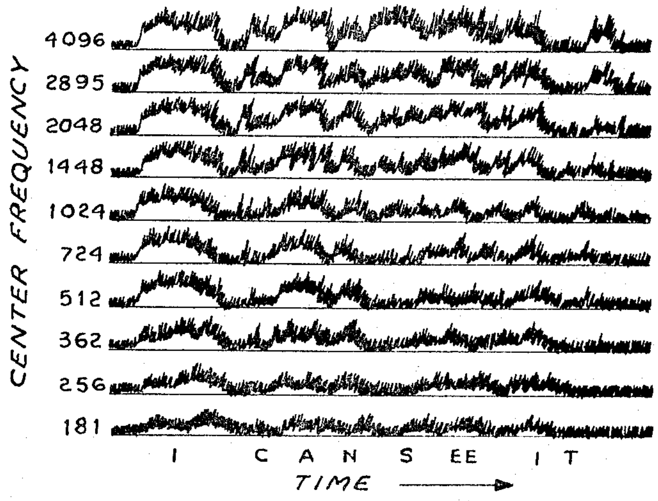
Figure 1B:
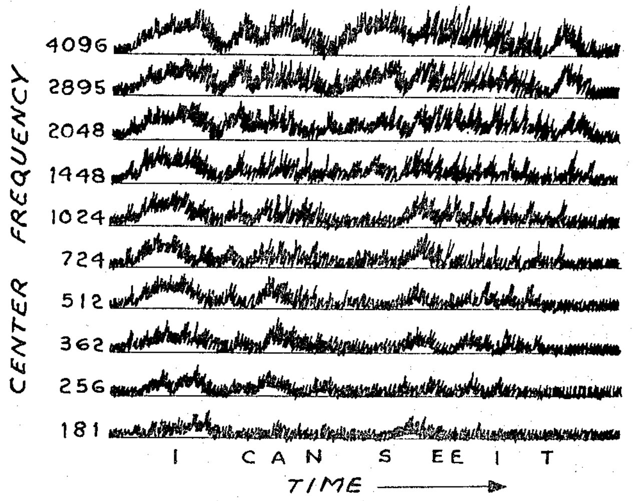
Figure 1C:
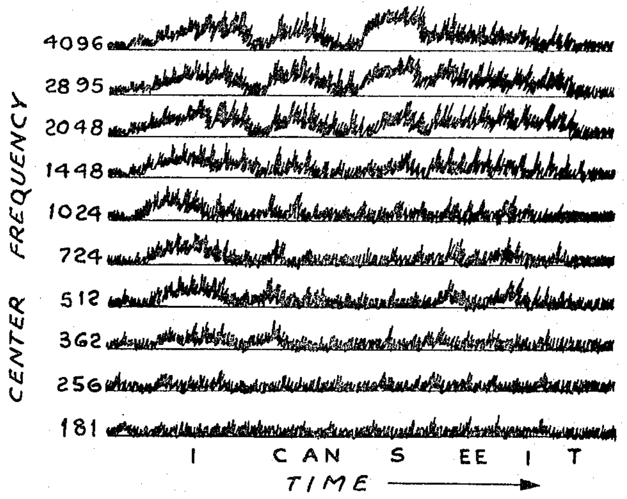

Referring now to FIGURES 1*a*, 1*b*, and 1*c*, three groups 1, 2, and 3 of power-trace sonagrams for the sentence "I can see it" are shown. These sonagrams are of a well known type and were produced by speakers from three different sections of the country with different accents. Each sonagram is composed of a group of power traces, each representing the power in one of ten different frequency bands. The center frequencies of these bands are indicated as 181, 256, 362, 512, 724, 1024, 1448, 2048, 2895, and 4096 cycles, and each band has a width of ±7.5% of the center frequency. These particular frequency bands have been found to give good results, although more or less bands with different frequencies might be chosen, as desired. In making these power traces, the power of the voice signal is measured in each particular frequency band and is plotted vertically against time in the horizontal direction. Thus, a power trace is formed of the power at that particular frequency band for the duration of the time that the sounds are being emitted. As is evident from an inspection of the drawing, these power traces are slightly different because of the different characteristics of the different speaker's voices.

Figure 2:
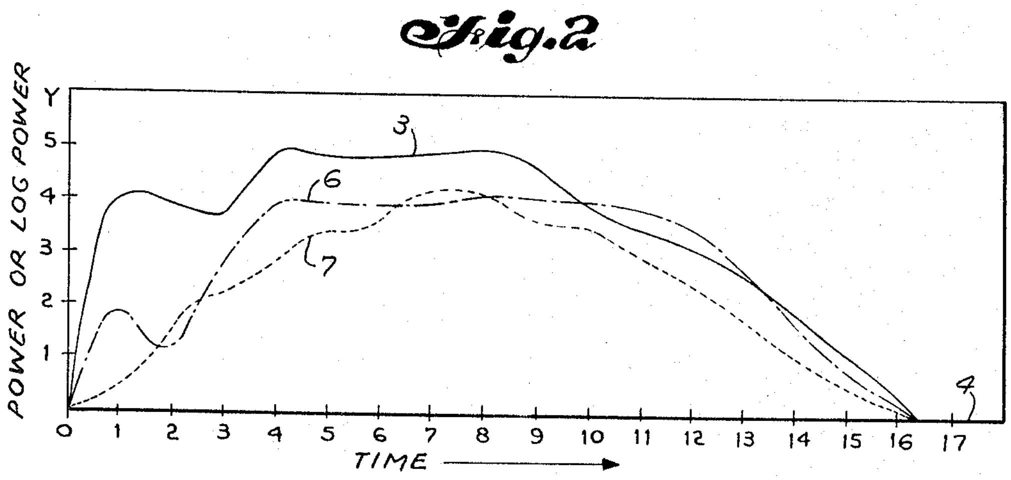
FIGURE 2 is a representation of the power traces in a single frequency range made by three different speakers enunciating a single word.

Power-trace sonagrams of this type are obtained from a large number of speakers, say a hundred, for each word that is to be in the reference library. The next step in preparing the library is to reduce each set of power traces for the hundred different speakers to a single pattern for each frequency band within which the trace produced by any speaker of the group will fall. This is accomplished by plotting a separate curve for each of the ten different frequency bands of FIGURE 1 and for each speaker of the group showing the power in the signal at a plurality of different sampling points along the time axis. In FIGURE 2 a power-trace curve 3 is shown for the 724-cycles-per-second band for the single word "I" corresponding to the signal produced by speaker 1 of FIGURE 1. The horizontal line 4 at the bottom of the figure represents the time axis and 17 sampling points have been found satisfactory for the purpose, although more may be used if desired. The points, representing the vertical deflections Y and indicating the power at these particular points, are found and the power-trace curve 3 drawn through these points.

It will be understood that there will be a power trace of this nature for each frequency band representing the energy in a single word, forming a family of power traces for that word. And it will be further understood that there will be a similar family of power traces for the same word representing the speech characteristics of each different speaker.

FIGURE 2 also shows two other power traces 6 and 7 for the same frequency band of 724 cycles for the same word "I," as produced by two other speakers. The curves for that particular frequency and word are plotted together for all the different speakers. Only the three curves 3, 6, and 7 have been shown to illustrate the principle involved. From an inspection of FIGURE 2 it will be seen that the widest variation in the characteristics of the different speakers appears at the beginning of the word and that towards the end the variation from speaker to speaker decreases.

The next step is to determine a hypothetical standard trace, each point of which would be the average vertical distance $\mu$ from the horizontal of all the traces. Such a standard trace for the frequency of 724 cycles is shown at 8 in FIGURE 3.

Figure 3:
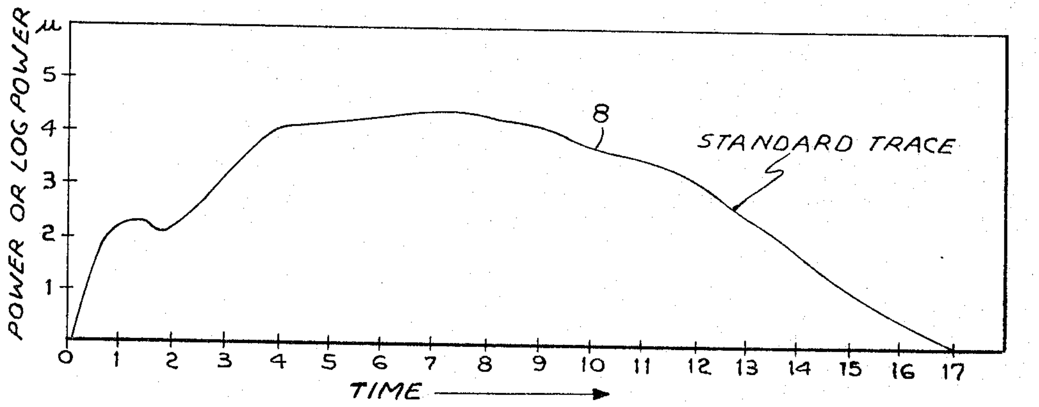
FIGURE 3 is a representation of a standard power trace which has been evolved from the traces of FIGURE 2.
Figure 4:
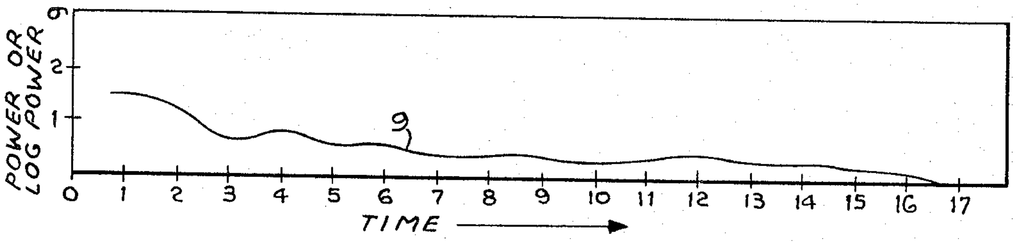
FIGURE 4 is a curve representing the standard deviation from the standard trace of the traces of FIGURE 2.
Figure 5:
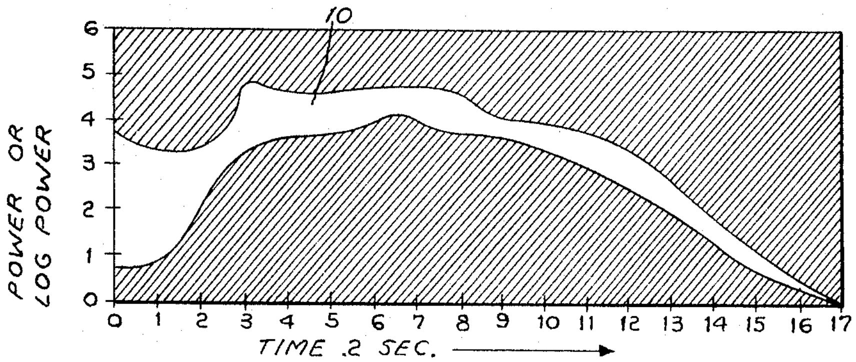
FIGURE 5 is a diagram of an acceptance band in the same single frequency range of FIGURES 2 to 4 within which the power trace produced by any speaker will probably fall.

FIGURE 4 is a curve 9 representing the standard deviation $\sigma$ derived from the standard trace 8 of FIGURE 3 and the other traces. Each point on the curve equals the square root of the sum of the squares of the difference between each trace and the standard trace divided by the number of traces. Combining this standard deviation 9 and the standard trace 8 by adding the standard deviation to and subtracting it from the standard trace for each sampling point, an area is defined within which, with 68% probability, a trace element may be expected to be found if the corresponding word is spoken. This acceptance band for the 724-cycles-per-second frequency is shown at 10 in FIGURE 5.

Figure 6:
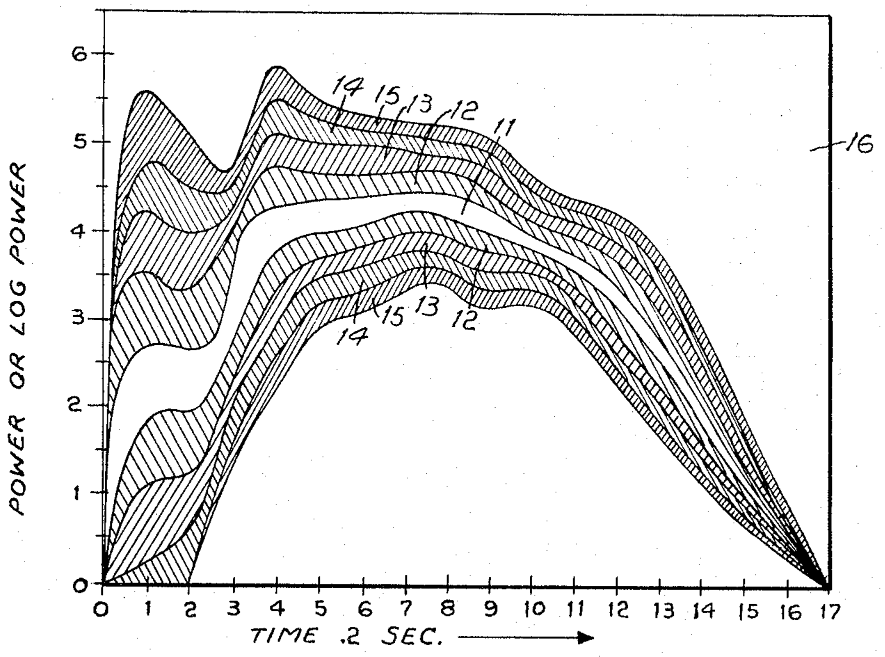
FIGURE 6 is a representation of a likelihood pattern of the acceptance band of FIGURE 5, showing different regions within which the power trace of an unknown word, if it is the same word as represented by the pattern, might occur, the regions being arranged in the order in which the trace is likely to occur.

A decided shortcoming of this acceptance pattern is the inherent choice of a fixed and rather arbitrary acceptance width and its inability to represent other than the assumed normal distribution of the variations in speech characteristics. In order to overcome these defects, we represent the probability of occurrence of any power level as a function of time by means of a photometric quantity which is readily available either continuously or in small steps. In FIGURE 6 the pattern of FIGURE 5 has been altered to show these regions of different probability of a power level. The region 11 through the central portion of the pattern represents that region where the trace is most likely to fall. This is the region closest to the standard trace. Next to the region 11, above and below it, are regions 12 where the trace is next likely to fall if it does not fall within the region 11. Similarly, the regions 13, 14, and 15 are regions of successively decreasing likelihood of where the trace will fall. These regions are arranged on a transparency 16. The central region 11, following the standard trace, has full transparency. From the center out, the transparency drops from band to band to .89, .61, .33, and .14, corresponding to the probability of observing traces within these bands if the particular word is spoken.

Some quantization of the probability levels have been shown in FIGURE 6 in order to illustrate the regions of different probability, but it is preferred to replace the quantized pattern by one in which the probability varies continuously along the vertical coordinate. If it is found that the distribution of deflection does not agree with the assumed normal distribution, then modified curves could be obtained experimentally relating excursion ranges to their relative frequencies.

These patterns, which are analog representations of the likelihood function, we call "L" patterns. If now we project the unknown trace as a luminous line upon the "L" pattern transparency, taking care that the flux on to each sampling point of the pattern is constant, then the total flux transmitted through each sampling point is the product of the flux through the reference pattern and that of the unknown trace. Measuring these fluxes separately for each sampling point by means of a linear photoelectric transducer and multiplying the outputs, a value can be arrived at which represents the posterior probability that the unknown trace was caused by the word corresponding to the pattern of the reference.

There is a certain amount of inconvenience in the above procedure, owing to the necessity of forming the products either from successive readings at all sampling points or by simultaneous readings in a plurality of independent photometric channels. We prefer to read the product in one operation with a single photomultiplier, and this may be accomplished by designing the "L" patterns to represent the logarithms of the likelihood functions. The transmisivity of the pattern is a maximum of 1 along the standard trace and decreases above and below this line in proportion to the logarithm of the likelihood of one corresponding deflection. If, now, the unknown trace is imaged onto the log "L" pattern, again emitting a constant flux per sampling interval, the photometer output through the log "L" pattern may be adjusted to yield the desired posterior probalility immediately.

The number of deflection samples taken along the trace may be arbitrarily chosen. One manner of selecting this number is to take twice the bandwidth of the analyzer output and multiply it by the time duration of the word. The samples might be uniformly spaced apart a number of seconds equivalent to one half the band width of the analyzer. The sampling rate was approximately 80 per second for the power trace shown in FIGURE 2.

We have found that much better results can be obtained if the sampling rate is very carefully chosen and, for best results should even vary with the particular mechanisms of speech generation. A sampling rate chosen to accommodate rapidly rising and decaying transients will produce strongly redundant samples if applied to slowly variable sounds of simple spectral structure, such as sustained vowels.

A simple way to provide desired variable sampling is to provide a mask for each pattern which may be superposed over the pattern leaving a set of vertical strips unobscured at the desired sampling points and obscuring the rest of the pattern. This assures a specific optimized sampling program for each word without requiring previous word recognition. In an "L" pattern masked in this fashion, it is possible to account for the variable redundancy by varying the sample spacing correspondingly.

Figure 7:
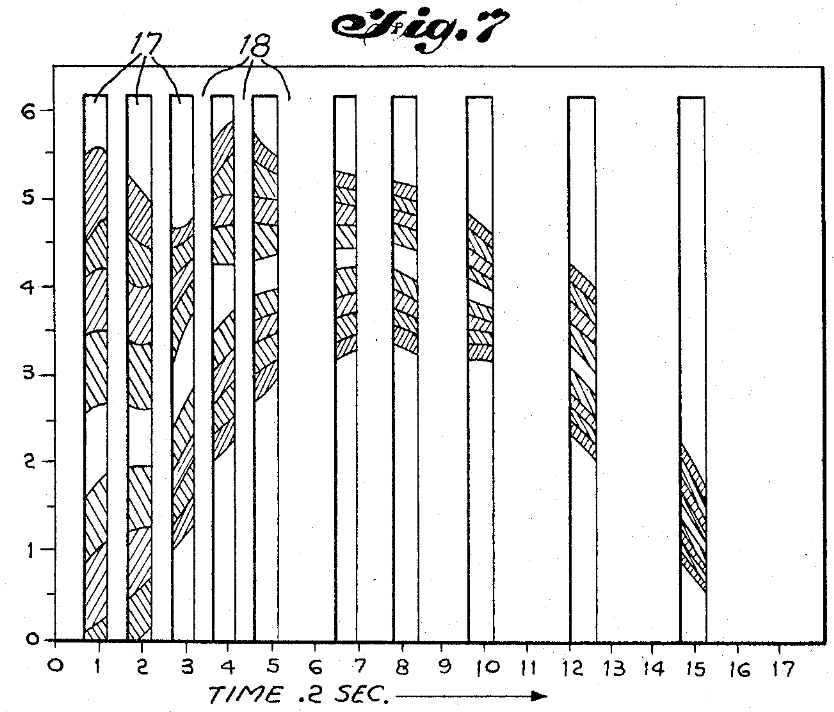
FIGURE 7 is a likelihood or L pattern shown masked for variable sampling intervals.

An example of a masked "L" pattern is shown in FIGURE 7 where the sample strips 17 are shown separated by spaces 18. The sample spacing is chosen inversely proportional to the information content observed in different sections of the pattern. However, optimized sampling of a power trace is not necessarily optimized for word recognition also. This is because the traces carry information pertaining to both the speaker characteristics and the word enounced. It is possible that variable sample spacing might tend to emphasize transient phenomena characteristic of the speaker rather than of the word. The example of FIGURE 7 illustrates just such a situation.

As has been mentioned before, the wide variation of speaker characteristics appears in the first section of the trace, while the later well-defined sections of the trace characterize the word and are nearly independent of the particular speaker. Thus, a high sampling rate applied to the initial transients tends to deemphasize the word characteristics, which is undesirable. Adjustment of the sampling rate does not always lead to such an undesirable shift of emphasis. Dense sampling of the first section of the word "tea" caused by the initial consonant sound would be required, but in this case, this dense sampling would emphasize a word characteristic aiding in the discrimination against near-homonyms like "pea," "free," "me," etc. We therefore prefer to modify the sampling procedure further so that undue emphasis on transient sections with insignificant word information is avoided.

Figure 8:
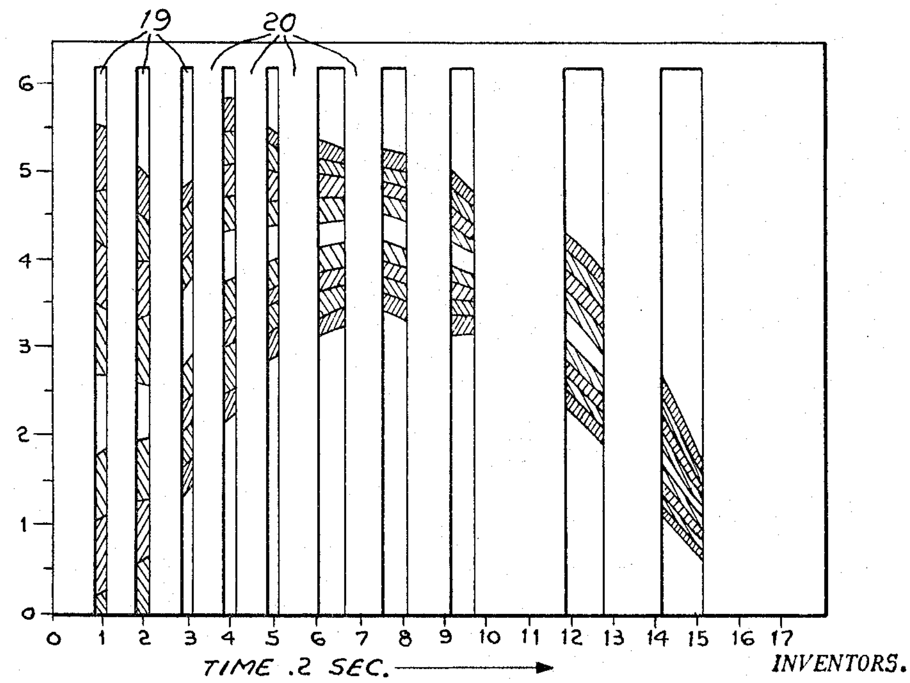
FIGURE 8 is the same likelihood pattern shown masked to give weighted samples in order to emphasize distinguishing characteristics.

The invention provides a solution to this problem by weighting samples according to their significance for word identification. One way of measuring this significance, although not necessarily the only one, is to take a value inversely proportional to the standard deviation of the deflections at each sampling point. The weighting coefficients may then be represented by varying the widths of the sampling strips. The trace of FIGURE 7, so varied, is illustrated in FIGURE 8 where the sample strips 19 are shown separated by spaces 20. The widths of the strips were chosen as a constant divided by the standard deviation. This constant may be chosen freely, but a particularly convenient choice would be one which makes the total sample width equal for all the words of the library. The constant would vary from word to word.

This procedure of weighting the samples assures that the maximum flux transmitted through the masked "L" pattern for each trace of the library pattern and the corresponding trace of the word to be compared, when that word is identical with the reference word, will be the same for all words. Since the probability values are given by the ratio of the observed transmitted flux to this transmitted maximum flux, this normalization will permit a direct and convenient measurement of the logarithm of the deflection of the unknown trace from the standard, solely by means of the light flux.

This method of reducing the highly redundant vowel sections in the "L" patterns is closely analogous to the techniques used by trained speakers to emphasize the consonants over the vowels and thus enhance intelligibility in normal speech communication.

Figure 9A:
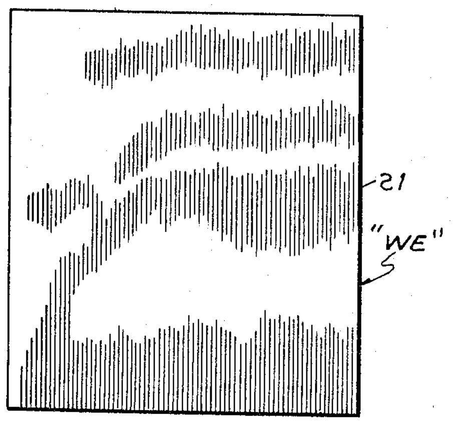
Figure 9B:
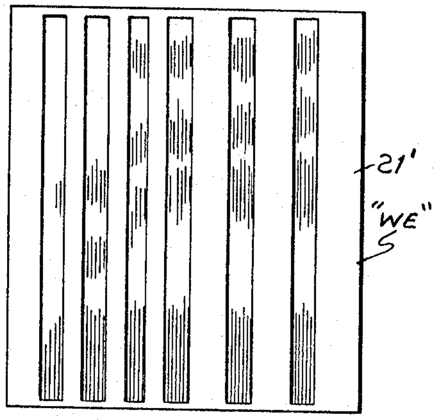
Figure 10A:
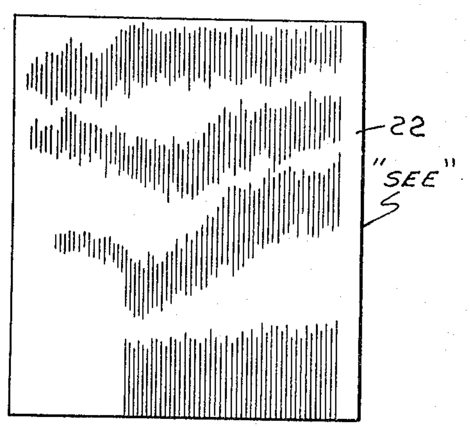
Figure 10B:
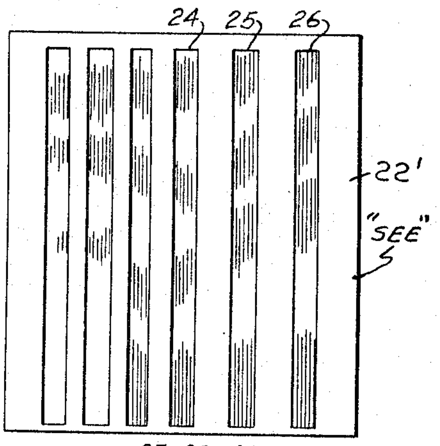
Figure 11A:
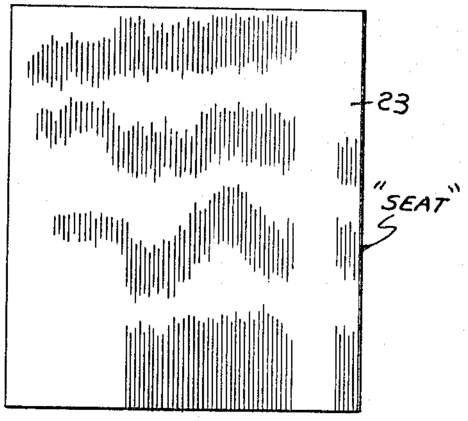

The speech recognition process of the invention involves making decisions based on the likelihood products which are continuously varying during the search of a large reference library. In order to obtain reliable decisions the reference pattern must be designed to maximize the probability that the unknown word is the same as the reference if they are identical and minimize the probability if the two are not identical. The former is taken care of by the procedure already described. But it does not necessarily follow that the second requirement will be satisfied. The procedure already described was based exclusively on the information contained in the unknown trace and the deviation function of the specific word pattern, without regard to the other patterns in the library. It is for this reason that the second requirement noted above may not be satisfied. In FIGURES 9*a*, 10*a*, and 11*a*, unmasked sonagrams (not "L" patterns) 21, 22, and 23, are shown for the words "we," "see," and "seat." It will be seen that if the patterns 21 and 22 are masked similarly, as shown in FIGURES 9*b* and 10*b* at 21′ and 22′, there will still be discrimination between the words "we" and "see." However, if the pattern 23 representing the word "seat" were to be similarly masked in a manner not shown, it will be evident that the probability is not minimized and the terminating consonants will not be distinguished, making confusion almost unavoidable. From this it follows that, in operation with a large set of patterns for a large library, choices between different possible traces will have to be made, requiring samples of high information content even within sections of the "L" patterns which had originally appeared strongly redundant.

For this reason, in order to produce a set of reference patterns permitting decisions on a high confidence level, an additional corrective adjustment of the sampling program will be required which necessitates an analysis of the entire library. This final adjustment may be made as follows: First a set of "L" patterns is prepared corresponding to the desired word repertory of the apparatus. The patterns are provided with removable sampling masks according to the previously explained procedure for sampling, spacing, and weighting. Then this library is incorporated into a photometric system for posterior probability evaluation and the maximum likelihood decisions are observed for each of the words as enounced by a suitable panel of speakers. In this way the probability of a response to a predetermined stimulus input for each sample of a particular trace may be obtained and the results may be represented by a confusion matrix with the rows corresponding to the inputs and the columns corresponding to the responses.

Figure 11B:
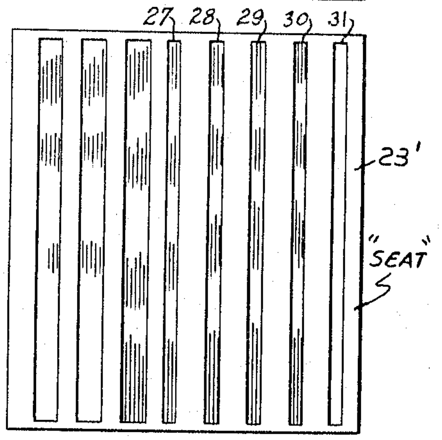

With any library of significant size, there will be some incorrect responses when a probability value will still appear when there should be none. To avoid this it will be necessary to subject each pair of patterns where such an incorrect probability value appears to a direct inspection to determine areas best suited to the descrimination of the two words. The sampling strips may then be redistributed to insure sampling of these discriminative areas. In FIGURE 11*b* the sonagram 23′ has had the sampling strips so redistributed. There the three last sampling strips 24, 25, and 26 of the sonagram 22′ of FIGURE 10*b* for the word "see" have been broken up into five narrower strips 27, 28, 29, 30, and 31 distributed over the vowel section, so that sampling of the terminal phase of the vowel is assured, and discrimination of the word "seat" over the word "see" is now assured. This last sample 31, enabling the discrimination between the two words, has now decreased redundance and therefore may require widening beyond its original width.

In extreme cases, the procedure will tend to put heavy emphasis on rather inconspicuous and apparently insignificant details of the reference patterns, if those details contain information useful for the discrimination between near-homonyms. This ability of the recognition of the invention to pay preferred attention to such discriminating details is one of its important features.

It should be noted that similar considerations may be used to change the relative contributions of entire frequency bands to the transmitted flux, if it should be found that the significance of these bands for identification is very unequal, a situation which could arise from an unfavorable choice of mid-frequencies and bandwidths of the analyzing filter bank which selects these frequencies from the enunciated words.

In FIGURES 12 and 13, a block diagram of one form of apparatus for carrying the recognition procedure is shown, FIGURE 12 showing the recording and reading apparatus and the sound spectrum analyzer, and FIGURE 13 showing the electron-optical evaluator. The input 35 of FIGURE 12 may lead from a microphone, recorder, telephone, or radio and feeds into a recording amplifier 36 the output of which drives the recording head 37. A magnetic tape 38 is supplied from a reel 39 and is drawn continuously and at a constant speed over the recording head 37 by a sprocket 40 continuously driven by a driving mechanism 41. The recording amplifier 36 is provided with an automatic gain control 42 in order to maintain a constant recording level.

The voice is continuously recorded on the tape. Then two-second intervals are read off, each in one second, leaving one second for making the search and the evaluation. In order to do this, the tape is fed over idler pulleys 43 to provide a free loop 44 from which it passes over a reading head 45, guided by suitable idler pulleys 46, to an intermittent sprocket 47 driven by an intermittent driving mechanism 28 which is in turn driven by the driving mechanism 41. Following the sprocket 47, another free loop 49 is provided in the tape by means of spaced idler pulleys 50. A sprocket 51, continuously driven from the driving mechanism 41 feeds the tape continuously to a take-up reel 52 over an idler pulley 53.

With this arrangement, a two-second interval of recording by the recording head 37 is drawn past the reading head 45 at twice the speed, so that the reading head delivers this interval of recording and then waits for the next two-second interval of recording. The take-up reel 52 is of course provided with the usual friction drive to compensate for the difference in diameter of the reel as the tape is wound on it. It is during the one-second waiting period that the search of the library and the evaluation of the words takes place.

The output of the reading head 45 is fed into an amplifier 54 and from there to a filter driver 55 which feeds the spectrum analyzer. The filter driven 55 is provided with an automatic gain control 57 for maintaining a constant average power level to be fed to the analyzer.

The analyzer 56 comprises a plurality of band-pass filters 58 of predetermined different center frequencies. The frequencies are arbitrarily chosen, but we prefer to have ten filters, each having a bandwidth of approximately 300 cycles, with the filters having the following frequencies: 3315, 2975, 2635, 2295, 1955, 1615, 1275, 935, 595, and 255 cycles per second. This is one set of filters having equal frequency increments with constant bandwidth. We have used also a set of filters having logarithmic frequency increments with equal percentage bandwidths. Each of these filters has its output fed through a rectifier 9 to an individual 50-cycle-per-second low-pass filter 60 which in turn is fed into a sequential sampler 61. The outputs from the ten filters 58 represent the instantaneous power contained within each of their pass bands, and the low-pass filters 60 provide the envelopes representing the power changes. The ten outputs of the filters 60 are fed into the sequential sampler 61 which is adjusted to sample at the rate of 2200 samples a second. The sampler is driven by a pulse generator 62 and decimal counter 63 which together serve as a central synchronizing-signal generator. The sample, thus controlled, will produce a series of dots whose size and brightness will not vary significantly with the most rapid rate of change of deflection amplitude permitted by the 50-cycles-per-second low-pass filters.

The signals from the sampler 61 are fed to a logarithmic amplifier 64, so that the logarithm of the power level may be fed to the electron-optical evaluator. This amplifier may comprise an oscilloscope 65, as shown in FIGURE 14, provided with an opaque mask 66 cut to a shape representing the logarithmic function over the face of the tube. The oscilloscope is provided with a phosphor having a very short decay time constant of approximately $10^{-7}$ seconds. A photomultiplier 67 is placed in front of the face of the tube so as to receive light from the spot of light on the phosphor. The input audio signals from the sequential sampler 61 is fed to the horizontal deflector 68 of the tube 65, so that the signal causes the light spot 65′ to move towards the left. A fixed bias is indicated at 69 and is adjusted to place the spot normally at the base of the curve on the mask with a zero signal input. The output of the photomultiplier, indicated at 70, is then added to the bias 69.

When the signal causes the spot of light to move towards the left, it starts to become obscured by the mask. This causes the output of the photomultiplier to become less negative, with the result that the spot is caused to move upwardly by the vertical deflection circuit. With sufficient gain in the vertical deflection circuit, the spot of light can be forced along the edge of the mask without changing its obscuration percentage significantly over the entire travel. The output of the photomultiplier will then be the logarithm of the input signal.

The logarithmic value of the signal is then fed to an adder 71 which is provided in order to add a step of voltage to the signal each time a different frequency band is sampled. In order to accomplish this, a staircase generator 72 is provided and arranged to produce voltage steps under control of the counter 63. Thus, each time the sampler 61 samples a different frequency band, the staircase generator raises the voltage of the output a predetermined step.

The output of the added 71 is now applied to the electron-optical evaluator shown in FIGURE 13. The function of the evaluator is to compare the waveform from each speech sample with each of the patterns stored in the word library, and to determine which, if any, of the words in the library were the ones represented by the input waveform.

The signal is applied to the vertical deflection circuit of an Iatron or similar storing display tube 74 which is arranged to store an image on its face for a period of one second, while the search through the library of words is carried on. The image on the face of the Iatron is directed by means of a mirror 75 through a variable anamorphic lens 76 of the Panavision or Superscope variety and a copy lens 77 to the photocathode of an image deflector tube 78.

The purpose of the anamorphic lens 76 is to produce a continuous variation of the horizontal dimension of the power traces of the spoken words in order that a comparison may be made of the unknown words with the words of the library, regardless of the speed with which the speaker enounces the words. This lens is driven by a motor 79 and a cam arrangement 80 in such a way as to cause the image continuously to expand and contract within predetermined limits sufficient to include the different speeds and speech characteristics of different speakers. The limits have been found to be about plus or minus 15%.

The motor-driven cam for controlling the lens is cut so as to cause the mganification to vary linearly with time and to make one complete traverse during a search cycle of one second. By scanning the word library ten times in one second, the horizontal size of the unknown waveform will be different by three percent each time it passes a given point.

A position transducer 81 on the anamorphic lens generates a signal that is fed to a deflection supply generator 82 which controls the horizontal deflection of the image deflector tube 78. By this means a constant horizontal travel of the image produced by the image deflection tube is maintained.

A mechanical coupling, indicated at 80*a* on the drawing, is arranged between the anamorphic lens 76 and the diaphragm of the copy lens 77 continuously to adjust the size of the diaphragm, so as to maintain a constant luminous flux density as the horizontal magnification is varied.

Another copy lens 83 forms an image of the unknown waveform, as it appears on the image deflector tube 78, on the word library 84. The patterns of the words for a one thousand word library are arranged in a 32 by 32 format on a film. The space assigned to each word in the library must correspond with the total space occupied by the image from the two-second speech sample in order to prevent the sample from scanning more than one word pattern at a time.

The speech sample contains a maximum of one hundred elements of information in a horizontal direction because of the limitation imposed by the 50-cycle-per-second low-pass filters in the analyzer. One word space on the film, therefore, requires one hundred total lines or fifty line pairs of resolution. Using Dupont Cronar base film for good dimensional stability, with the Ortho-Litho emulsion for good contrast and definition, up to two hundred line pairs per millimeter may be resolved. If the apparatus is designed for this resolution, the entire one thousand word library could be put on a film 8 millimeters square. However the use of a film this size would require impractical mechanical tolerances and the performance would be subject to large errors caused by small surface defects in the film. We propose, therefore, to use 25 line pairs per millimeter, and we thus obtain much higher image contrast with a linear tone scale having a large dynamic range, and the problem of mechanical precision and surface defects are significantly reduced, while still maintaining a library small enough to be convenient. At this rating each word space will occupy an area of two millimeters square and the entire library will be 64 by 64 millimeters or approximately 2½ inches square.

The deflection supply 82 causes the image from the deflector tube to scan the 32 rows of words in the library in the manner of a television scanner.

A condenser lens 85 is placed directly behind the library 84 to collect the light that is transmitted through it. The focal length of this lens is chosen, and the spacing of the components is arranged, such that it images the stop of the copy lens 83 onto the photocathode of a photomultiplier tube 86. Thus, the spot of light on the photocathode will vary in brightness only and will not move over the surface as the word library is scanned. This arrangement eliminates signal amplitude errors caused by local non-uniformity in the sensitivity of the photocathode. A photomultiplier is chosen having a maximum signal-to-noise ratio with the light available from the phosphor on the image deflector tube and with the large frequency band width required to accommodate the rapid scanning of the word library.

The photomultiplier dynode supply voltage is adjusted, so that when the system is in operation, the maximum anode current does not exceed 200 microamperes. At this small a percentage of the rated anode current, very stable operation is obtained. The anode load resistor for the photomultiplier is selected so that its value is small compared to the shunt capacitive reactance in the anode circuit at maximum signal frequency. For a frequency of one megacycle and with a type 6342A photomultiplier working into a cathode follower, the value of this load resistor is 3900 ohms.

The photomultiplier feeds into a linear amplifier 87 to raise the amplitude of the signal to a level that is convenient for further processing. This amplifier feeds into a threshold discriminator 88 which contains a fast-acting keyed clamp and a sharp-cutting, precisely-regulated biased clipper to establish a signal level that will give the desired probability of a match between the unknown speech sample and a pattern in the word library. This level may be controlled by adjusting a regulated bias voltage to the clipper. Recognition signals passed by the clipper are further amplified, clipped, and differentiated in the threshold discriminator, so that pulses having constant width and amplitude may be applied to the word selector 89 to which the output of the threshold discriminator is connected. The word selector 89 is used to determine which of the words in the reference library is recognized as corresponding to the unknown sample. It comprises a quantizing circuit 90 which is connected to the deflection supply circuit 82 and is arranged to quantize signals representative of the instantaneous position of the unknown speech pattern into 32 discrete levels for each deflection. The quantizing circuit is arranged to generate enabling pulses for each of these levels. The word selector further comprises a 32 by 32 AND gate matrix, each gate 91 having three inputs. The enabling pulses of one set are applied to the rows of the matrix and those of the other set are applied to the columns. The recognition pulse from the threshold discriminator is applied to all AND gates simultaneously, but no AND gate can open unless it receives an enabling pulse from the row and column wire also.

The AND gates 91 are indicated where the rows and columns cross. The outputs of the AND gates 91 lead over wires, indicated by the single line 93, to a word display 92 in which each word may be represented by a light which will be illuminated when the associated AND gate is opened, for example, by the operation of suitable relays, not shown. The relays may control contacts which will energize output leads, indicated at 94, which will lead to a printer, punch, teletype, recorder, or other control apparatus designed to operate as the result of the recognition of the words as they are received by the apparatus.

In the operation of the apparatus, the audio signal from a speaker's microphone or other input device is continuously recorded on the tape 38 by the recording head 37. The tape is fed by the continuously driven sprocket 40 into the free loop 44 from which it is intermittently drawn by the intermittent sprocket 47 past the reading head 45 at twice the speed at which it was recorded. Two-second intervals of the recorded voice are thus read off by the reading head 45, and, after being amplified by the amplifier 54, are fed to the spectrum analyzer 56 where the different frequency bands in the signal are separated out, rectified by the rectifiers 59, and passed through the low-pass filters 60, to the sequential sampler 61. A signal from each frequency band, representing the instantaneous power in that band, is thus delivered to the sampler.

The sampler, under control of the pulse generator 62 and the counter 63, samples the power in the frequency bands successively at the rate of 2200 samples per second and feeds these samples through the log amplifier 64, where each sample is translated into a value representing the logarithm of the power in that sample.

The adder 71, under control of the staircase generator 72 and the counts 63, adds a voltage step for each succession of samples corresponding to one frequency band, so that the signal fed into the electron-optical evaluator is in voltage steps, the power of each frequency band being on a different step.

The stepped power trace signal is then fed into the vertical deflection circuit 73 of the Iatron 74 of FIGURE 13 whose horizontal deflection is equal to the time of the sampling of one frequency band, so that an image of the power traces for the two-second interval appears on the face of the Iatron tube.

The mirror 75 then reflects the image into the variable anamorphic lens 76 which changes its horizontal magnification continuously. The copy lens 77 projects this constantly changing image onto the photocathode of the image deflector tube 78, which, by means of the deflections circuits controlled by the deflection supply 82, causes the entire image to scan the library 84 upon which it is directed. Thus, the image will sweep across each row of the reference word patterns ten times in the second which is available for the search, and each time it sweeps, the horizontal size will have changed by three percent.

As the image sweeps across the word forms, the light from the image will pass through each word form in succession and will fall on the photomultiplier 86. Whenever the amount of light is such as to reach a predetermined probability level that the word which produced the image is the word of the reference library upon which the image falls at that instant, as determined by the threshold discriminator 88, the gate 91 corresponding to that word is enabled, since both row and column wires are simultaneously energized, and that gate will open and pass an impulse to the word display 92, so that the word is indicated. At the same time a signal for that word is passed on over the individual wire 94 to a printer or other device.

The entire search of the library to recognize the words of the two-second speech sample occupies one second. During the one-second time that this two-second sample is read off the tape and the one-second time that the search is taking place, another two-second interval of speech is being recorded on the tape by the recording head 37, so that now, when the intermittent sprocket again operates, this next two-second recording is read off, and this cycle is repeated.

It may be found that the break between the consecutive two-second intervals occurs in the middle of a word or syllable, so that a word may be missed at the beginning or end of an interval. To overcome this difficulty, two tape recorders may be used, each adapted to record for a two-second period, but the operation of the recorder is staggered, so that the break in the recording of one occurs in the middle of the recording of the other. Each recording apparatus has its own spectrum analyzer and electron-optical evaluator and any word missed by the one will be picked up by the other.

The threshold discriminator 88 will produce a signal whenever the light flux exceeds a predetermined level. Short words like "why" and "aisle" are both contained within the single word "while." In order to prevent such shorter words from being erroneously recognized when the actual word spoken contains them, the word library is programmed so that the longer and more complex words are scanned first. When a recognition signal is generated, an inhibit voltage will be produced in the word selector to prevent additional word readouts from subsequent shorter words contained within the word producing the signal until after a new pattern has been written on the Iatron.

Many variations of the invention, especially in the manner of constructing the word library and in scanning the library with the unknown waveform may be resorted to without departing from the spirit of the invention, and we do not therefore wish to limit ourselves to the specific arrangement shown and described except by the limitations contained in the appended claims.

What we claim and desire to secure by Letters Patent is:

1. The method of recognizing spoken words which comprises preparing a word library of reference patterns of a predetermined plurality of words, each of said reference patterns comprising a series of traces each representing power in a different frequency band plotted against time, the width of the trace at any time position being such as just to encompass the power traces at that time position produced by a predetermined number of different speakers enouncing the same word, producing an image of a spoken word to be recognized having a corresponding number of power traces, comparing said image with each of said library reference patterns, simultaneously adjusting the length of said image through a predetermined range, producing an indication when said image corresponds with a reference pattern of said library, and utilizing said indication to identify said word.

2. The method of recognizing spoken words, as defined in claim 1, in which the comparing step comprises superposing a projected image of the pattern of the word to be recognized over reference patterns, and the step of producing an indication comprises measuring the comparing step results and producing a signal if it rises above a predetermined level.

3. Apparatus for recognizing spoken words comprising a library of reference patterns of a predetermined number of words, each pattern comprising a series of traces each representing power in a different frequency band plotted against time, the width of the trace at any time position being such as just to encompass the power traces at that time position produced by a predetermined number of different speakers enouncing the same word, means for producing an image of the pattern of the spoken word to be recognized having a corresponding number of power traces, means for comparing said image with the reference patterns, means for producing an indication when there is a correspondence between said image and a reference pattern, and means for utilizing said indication to identify the reference pattern which corresponds with said image.

4. Apparatus, as defined in claim 3, further comprising means for altering the size of the image between predetermined limits in the time direction during the operation of the comparing means.

5. Apparatus, as defined in claim 4, in which the reference patterns are transparencies and the image of the pattern of the spoken word to be recognized is a light image, and in which the comparing means comprises means for projecting said image upon said reference pattern and measuring the light flux projected therethrough.

6. Apparatus, as defined in claim 5, in which the reference patterns of the library are masked at predetermined points along the time axis to decrease redundancy in the light flux passing therethrough.

7. Apparatus, as defined in claim 6, in which the reference patterns of the library are masked at predetermined points along the time axis to emphasize distinguishing characteristics between words.

8. Apparatus, as defined in claim 5, in which the reference patterns of the library are masked at predetermined points along the time axis with masks of different widths, the widths of the masks being adjusted so that the total unmasked portions of each pattern have the same light value.

9. Apparatus, as defined in claim 8, in which each power trace in each word pattern of the library has a thin, transparent central section extending in the time direction and representing a standard trace, and the remaining portions of said pattern become more and more opaque above and below said section in inverse proportion to the probability that the trace of a word to be identified will fall therealong if that word is identical with the word of the library pattern.

10. Apparatus, as defined in claim 9, in which the change in opacity of the portions of the trace above and below the standard trace is in discrete steps.

11. Apparatus, as defined in claim 3, in which the reference patterns of the library are masked at predetermined points along the time axis to decrease redundancy in the comparison points therealong.

12. Apparatus, as defined in claim 11, in which the reference patterns of the library are masked at predetermined points along the time axis to emphasize differentiating characteristic between different words.

13. Apparatus, as defined in claim 3, in which the reference patterns of the library are masked at predetermined points along the time axis with masks of different widths, the widths of the masks being adjusted so that the total unmasked portions of each pattern have the same light value.

14. Apparatus, as defined in claim 3, in which each power trace in each word pattern of the library has a thin, transparent, central section extending in the time direction and representing a standard trace and the remaining portions of said pattern become more and more opaque above and below said section in inverse proportion to the probability that the trace of the word to be identified will fall therealong if that word is identical with the word of the library pattern.

15. Apparatus for recognizing any one of a plurality of sounds comprising means for translating said sound into a set of power traces each representing the logarithm of the instantaneous power in one of a plurality of predetermined frequency bands, a library of power trace patterns of said sounds in which each sound is provided with a set of patterns each representing the logarithm of the power of that sound in one of the same frequency bands, each of said traces having a width such that it will just encompass the power traces produced by all of a predetermined number of speakers having different speech characteristics, said library being formed as a transparency with all but the power traces being opaque, an electronic storage tube capable of storing an image of a set of power traces for a predetermined time, means for applying the set of power traces of a sound to be recognized to said storage tube so as to produce the image of said traces on the face of said tube, an image deflector tube, means including an anamorphic lens for imaging the face of said storage tube on the photo-cathode of said image deflector tube, means cyclically altering said anamorphic lens to change the magnification thereof cyclically in one direction, means for directing the image on the face of said image deflector tube onto said library of power trace patterns, means for operating said image deflector tube so as to cause said image on the face of said tube to shift cyclically in accordance with a predetermined scanning pattern, whereby the image thereon is caused to scan said library of power trace patterns, means for collecting light from said unknown trace passing through said library, means for creating a signal when the collected light exceeds a predetermined flux, and means controlled by said image-deflector operating means for identifying the particular pattern in said library which produces a signal.

16. Apparatus, as defined in claim 15, in which the power-trace patterns in the library are graded in opacity from a transparent trace through the center representing a standard power trace derived from the power traces produced by the predetermined number of speakers to opaque areas above and below said trace, the opacity varying between said standard trace and said opaque areas inversely with the probability of the unknown trace falling within a particular area.

References Cited by the Examiner

UNITED STATES PATENTS

| | | | |
|---|---|---|---|
| 2,575,910 | 11/1951 | Mathes | 179—1 |
| 3,094,586 | 6/1963 | Dersch | 179—1 |

KATHLEEN H. CLAFFY, *Primary Examiner.*

R. MURRAY, *Assistant Examiner.*